Nov. 3, 1964 H. R. CHOPE 3,155,898
METHOD AND APPARATUS FOR MEASURING MULTIPLE PROPERTIES
OF MATERIAL BY APPLYING ELECTRIC FIELDS AT MULTIPLE
FREQUENCIES AND COMBINING DETECTION SIGNALS
Filed July 11, 1960

INVENTOR
Henry R. Chope
By Anthony D. Cennamo

United States Patent Office 3,155,898
Patented Nov. 3, 1964

3,155,898
METHOD AND APPARATUS FOR MEASURING MULTIPLE PROPERTIES OF MATERIAL BY APPLYING ELECTRIC FIELDS AT MULTIPLE FREQUENCIES AND COMBINING DETECTION SIGNALS
Henry R. Chope, Columbus, Ohio, assignor to Industrial Nucleonics Corporation, a corporation of Ohio
Filed July 11, 1960, Ser. No. 41,971
11 Claims. (Cl. 324—58.5)

This invention relates generally to methods and arrangements for continuously analyzing a composite material and more particularly to a system which utilizes electromagnetic energy at a plurality of frequencies for deriving information capable of yielding quantitative data regarding multiple properties of a composite material including the concentration of components thereof.

Systems have been provided in the past for detecting individual components in a composite material with limited application to the detection of a plurality of components. For example, arrangements have been disclosed for probing a composite material with a plurality of different radioactive sources and selectively detecting the radiations penetrating the material from each source whereby signal quantities are obtained which may be utilized in analog computer apparatus for deriving information about the particular components in the composite material. The present invention discloses arrangements for obtaining quantitative multiproperty data using signals derived from instrumentation operating in alternating current and radio frequency regions up to and including microwave frequencies.

The primary object of the present invention is to provide a method and system for measurement and control of material in a continuous industrial process by means of simultaneous analysis of that material with a plurality of different frequency signals and deriving from the detected signals at the plurality of frequencies the influences of the composite effect of the individual components and other properties of the material. By utilizing the derived signals in an appropriate manner the calculation of the quantitative values of the individual components of the material can be obtained.

The invention will be more clearly understood and the objects thereof become apparent from the following description taken in conjunction with the accompanying drawing wherein.

Figure 1:
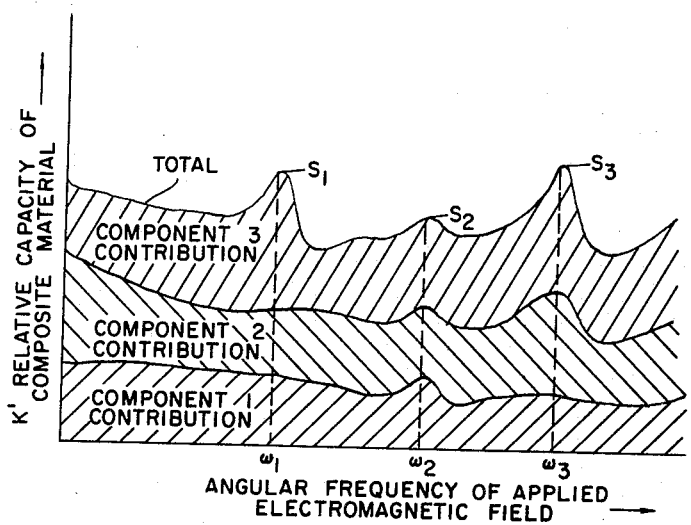
FIG. 1 is a diagram helpful in understanding one aspect of the invention.

In an electromagnetic detection system the quantity detected will be a circuital current or voltage having characteristics which are determined by the nature of the material that is subjected to the electromagnetic field, either in a condenser or coil, or by irradiation.

If the material is passed through a condenser or coil in which radiofrequency currents flow, a portion $E_L$ of the associated electric field $E=E_0 e^{j\omega t}$ penetrates the material and causes each atom or molecule to polarize (i.e., become an electric dipole) to a degree characteristic to that particular atom or molecule according to the relation $$p = \alpha E_L \tag{1}$$

where $p$ is the degree of polarization of a particular atom or molecule and $\alpha$ is a constant characteristic of that atom or molecule called its "polarizability." In this analysis, it will be understood that the underlined symbols represent vector quantities.

In a pure one-component material each polarized atom or molecule contributes equally to form a gross electric polarization which is conveniently described by the quantity "polarization per unit volume" P which is consequently independent of the actual volume of the material.

On the other hand, in a material which is a mixture of several component materials each type of atom or molecule contributes to the total polarization per unit volume P in proportion to its individual dipole strength weighted by the relative number of such atoms or molecules per unit volume as follows:

$$P = N_1 p_1 + N_2 p_2 + N_3 p_3 + \ldots \tag{2}$$

where $N_1$, $N_2$ and $N_3$ represent the number of atoms or molecules per unit volume of components 1, 2, and 3, respectively. It is in this way that the measurable quantity P is influenced by the relative quantities of each component present.

The measurement of P is accomplished by the measurement of the relative dielectric constant K (or relative capacitivity) which by definition is related to P as follows:

$$P = \epsilon_0 (K-1) E \tag{3}$$

where E is the applied electric field and $\epsilon_0$ is the capacitivity of a vacuum. The measurement of K for a material in a condenser is accomplished by a measurement of the condenser's capacitance $C = KC_0$ or its capacitive susceptance $B_c = j\omega C = j\omega K C_0$ in a bridge circuit. The quantity $C_0$ is the capacitance with the material absent. Thus, under conditions which are constant otherwise, a change in the capacitive susceptance $B_c$ reflects a change in the proportions of the material components.

In the process of polarizing an atom or molecule, its internal structure undergoes a small deformation due to the presence of the electric field E. Thus displacements of masses opposed by elastic chemical bonds result. Such a system is capable of mechanical vibrations at one or more resonance frequencies. Furthermore, the deformations do not occur in the same time phase as do the time variations of the electromagnetic field E. Consequently the proportionality constant $(K-1)$ relating P and E must have the form of a complex number, i.e., $$K = K'' - jK'' \tag{4}$$

in order to account for the differences in phase. Thus the measurement of K produces two values, K' which appears in the capacitive susceptance, and K'' which appears as an A.C. conductance.

The admittance, Y, of the condenser is $Y = j\omega K C_0$
$= j\omega K' C_0 + K'' C_0$
$= j$ (capacitive susceptance) + (A.C. conductance)

Because of the mechanical resonances of the atoms or molecules, the degree and phase of polarization P (for constant applied electric field amplitude $E = E_0 e^{j\omega t}$) vary with the periodic frequency $\omega$ in a complicated way, there being extreme values of P and therefore K' and K'' for values of the frequency approximately equal to the mechanical resonances of a particular type of atom or molecule. Thus the contributions to the total polarization P from the individual components of a multicomponent material occur in different ratios at different frequencies of the applied electromagnetic field.

FIG. 1 is a schematic representation of the effect of three material components 1, 2 and 3 on the dielectric constant of a mixture thereof. This is a generalized plot of expected variations in the value of K', the total relative capacitivity of the composite material, as a function of the angular frequency $\omega$ of the applied electromagnetic field. From this figure one may select three frequencies $\omega_1$, $\omega_2$ and $\omega_3$ at points where the component contributions to K' have contrasting ratios, thus obtaining three signals $S_1$, $S_2$ and $S_3$ proportional to K' at the selected frequencies. A change in the relative quantity of component 1, 2 or 3 will therefore cause corresponding but contrasting changes in all three signals $S_1$, $S_2$ and $S_3$.

Measurements of $K'$ and $K''$ in the microwave region of the spectrum of course involve other techniques such as the determination of wave guide impedance as modified by the presence of the material or by the determination of reflection, transmission and absorption of electromagnetic radiation used to irradiate the material.

The present invention as applied to a given industrial process is arranged to analyze a transported material which is present in the industrial process. This material may be made up of a plurality of components which are intermixed in a substantially homogeneous mass and which during the industrial process may have a substantially fixed nominal set of characteristics. In conventional continuous processes the control problem is to maintain the material at the set of characteristics corresponding to the specification for the product to be manufactured. The material to be analyzed therefore is composed of relatively fixed amounts of known materials, and variation in the relative proportions of these materials is confined to small deviations about a fixed nominal value. For these conditions the relative concentrations of the individual components of the material can be considered to have a linear relation to the signal produced in an associated electric circuit when the material is examined by an electromagnetic field. Thus the signal in general will have the form of a linear equation in which each term of the equation includes an unknown representing the relative quantity of a particular component in the material and the coefficient for each unknown in the terms of the equation is the constant of proportionality in the approximately linear relation between variation in that component and the detected signal at the particular frequency employed. The present invention utilizes a plurality of such equations derived at different frequencies in a manner to assure that the set of equations obtained is linearly independent. For any given number of unknowns in the material a like number of distinct frequency electromagnetic energy sources is employed so that the number of linearly independent equations in the set is equal in number to the number of the unknowns and hence the set of equations is capable of solution simultaneously for each of the unknowns.

A solution of a general set of independent linear equations relating $n$ material unknowns $Y_1 \ldots Y_n$ to the measured signal quantities $S_1 \ldots S_n$ is given as follows:

$$Y_1 = A_{11}S_1 + A_{12}S_2 + \ldots + A_{1n}S_n$$
$$Y_2 = A_{21}S_1 + A_{22}S_2 + \ldots + A_{2n}S_n$$
$$\vdots \qquad (5)$$
$$Y_n = A_{n1}S_1 + A_{n2}S_2 + \ldots + A_{nn}S_n$$

In this set of equations the $S_1$, $S_2 \ldots S_n$ are the quantities derived from the measured currents associated with the transducers used to subject the material to the frequencies $f_1 \ldots f_n$ respectively. The unknowns $Y_1, Y_2 \ldots Y_n$ represent the respective characteristics such as relative concentration of the constituents of the mixture which characteristics are individually controllable to produce the desired product of the industrial process. The $A_{11}, A_{12} \ldots A_{1n}$ and $A_{21}, A_{22} \ldots A_{2n}$ etc. are the coefficients of the linear equations derived as hereinafter described. With the coefficients $A_{ij}$ of these equations known and with the $S_1 \ldots S_n$ measured at distinct frequencies $f_1 \ldots f_n$ the $n$ equations are completed and can be solved for the $Y_1 \ldots Y_n$ variables.

Figure 2:
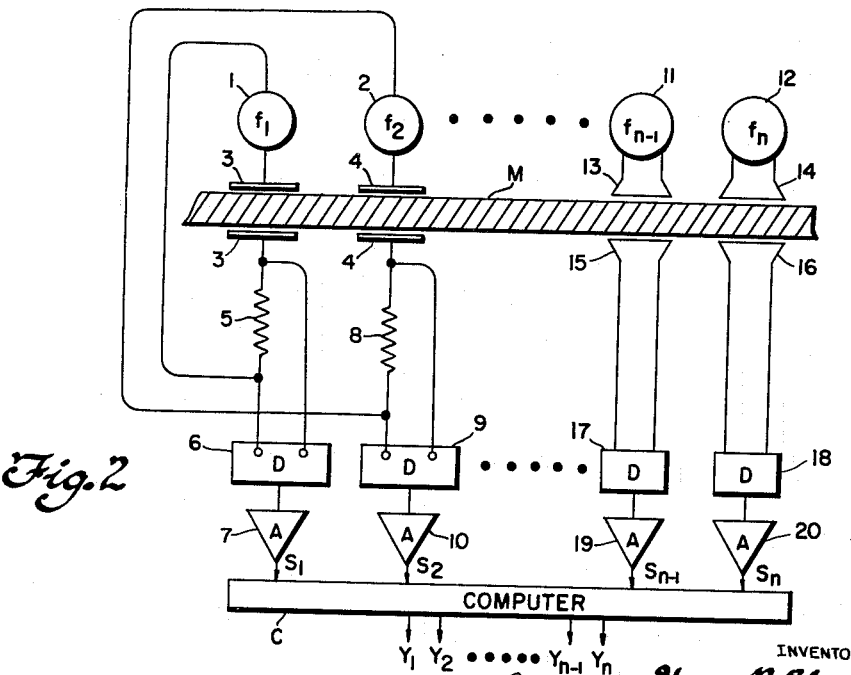
FIG. 2 is a block diagram, partly schematic, of an embodiment of the invention.

Referring now to FIG. 2 a specific embodiment of the invention is shown for use with frequencies in the radio and microwave spectrum. For this purpose a transported material M may be subjected to electromagnetic fields at a plurality of frequencies. Relatively low frequencies $f_1$ and $f_2$ may be generated by oscillators 1 and 2 which are connected to spaced plates 3 and 4. The plates 3 form a capacitor in which the material M constitutes at least part of the dielectric and hence the properties of the material M will influence the current of frequency $f_1$ which flows through a small value resistor 5 in circuit with the generator 1 and capacitor 3. This current at frequency $f_1$ is detected by a suitable detector circuit 6 to produce, after amplification in amplifier 7, if required, the signal $S_1$. In similar manner the material M between the plates 4 influences the current at frequency $f_2$ flowing in a small value resistor 8. The magnitude of the current flowing in resistor 8 is detected in detector 9 and amplified in amplifier 10 to produce the signal $S_2$.

Any required number of individual frequencies $f_1, f_2 \ldots f_n$ may be used to probe the material M and the circuits at each frequency will conform with the practice conventional to the particular frequency region. Thus at the higher frequencies microwave techniques may be employed. As previously mentioned one form of microwave measurement would be a transmission-absorption system. Measurements of this type are obtained in FIG. 2 at the frequencies $f_{n-1}$ and $f_n$ which are generated by microwave generators 11 and 12 and propagated by horns 13 and 14 to receiving horns 15 and 16 respectively. Energy received by horns 15 and 16 is detected by microwave detectors 17 and 18 and the resulting signals after amplification in amplifiers 19 and 20 are the $S_{n-1}$ and $S_n$ signals. It will be apparent that the microwave circuits shown may be modified as required for obtaining impedance matching and otherwise satisfactory performance in accordance with standard microwave practice.

The output signals $S_1, S_2 \ldots S_n$ provide signals for a computer C corresponding to the general set of equations which the computer C solves for the $Y_1, Y_2 \ldots Y_n$ of Equation 5. Arrangements for solving a general set of $n$ equations are known in the art and any suitable equipment of this type may be used. Conventional arrangements of computers for solving a general set of linear equations are disclosed, for example, in U.S. Patents 2,905,821 and 2,911,146.

To calibrate the computer C the coefficients of the terms in the set of $n$ equations must be determined. One method of obtaining the equation coefficients utilizes standard samples of the composite material in which known deviations of a particular component from the specification value for that component are present. A set of $n$ standard calibration samples each having a known deviation in one of the respective components $Y_1, Y_2 \ldots Y_n$ is applied to the measuring system such as shown in FIG. 2 and the resulting set of $n$ equations are solved for the coefficients $A_{ij}$ of the $Y_n$, the $Y_n$ being known for the standard sample under test.

The calibration procedure may be facilitated and the sensitivity of the process measurements enhanced by selecting the frequencies $f_1$ to $f_n$ to be selectively influenced to a higher degree by a particular component variation in the material M. For example, by choosing a frequency for which variations in one component produce a marked effect on the signal detected and at which frequency variations in the other components produce relatively little effect on the detected signal, the coefficient in the linear equation relating the detected signal for this frequency with the unknown representing the effective component in the material M will be relatively high in comparison to the coefficients for the other unknowns. Thus when the material M is being measured in an industrial process, variations in the unknown component for which the selected frequency produces a large coefficient in the equation for the detected signal will result in a high sensitivity measurement of that particular unknown. If frequencies are selected for each of the unknowns in like fashion this system will operate with high sensitivity with respect to each unknown while having the improved accuracy resulting from the solution of the simultaneous equations for the relatively minor effects of the other unknowns in the equations.

Manifestly the solution for the individual $Y_n$'s provides control signals which may be employed to control the actual process variables corresponding to the respective $Y_n$'s. The signals $Y_1 \ldots Y_n$ may be utilized therefore by any known control systems to control the variables of the process corresponding to the respective Y's.

While only a single preferred embodiment of the invention has been disclosed it will be understood from the present teaching that applicant's invention may be applied in a wide variety of measuring systems to deduce information relating to a plurality of components from a material by applying an equal plurality of frequencies to that material. Where the material produces both conduction and displacement current terms in the detected signal the measurement may utilize the complex current or only the real or imaginary terms in the detected current at each frequency. Thus the solutions obtained with the detected currents can be manipulated relative to both real and imaginary terms of a complex current and the computer arranged accordingly to provide the desired output quantities as the computed values.

The operating frequencies employed in the present invention include the lower alternating current frequencies and extend up through the microwave frequencies as hereinbefore set forth. In the appended claims the term radio frequency shall be deemed to include any frequency in this range.

The invention accordingly will be understood to be limited only by the scope of the appended claims.

I claim:

1. The method of measuring multiple properties of a product transported in a continuous industrial process comprising the steps of subjecting said product simultaneously to a plurality of alternating electromagnetic fields of different frequencies not higher than the microwave region, detecting simultaneously a signal at each of said frequencies which has a characteristic influenced by said properties, and electrically combining said signals to obtain a quantitative measure of each of said properties.

2. The method of measuring multiple properties of a product transported in a continuous industrial process comprising the steps of simultaneously generating a plurality of radio frequency fields at different frequencies, passing said product through said fields, detecting simultaneously a signal at each of said frequencies which has an amplitude determined by said properties, and electrically combining said signals to obtain a measure of each of said properties.

3. The method of measuring multiple properties of a product transported in a continuous industrial process comprising the steps of simultaneously passing said product through a plurality of different radio frequency fields so that said product is simultaneously subjected to as many distinct frequency fields as the number of said properties which are to be measured, detecting a signal from each of said distinct frequency fields the magnitude of which is a function of all of said properties, selecting the frequencies of said fields to make the relation between said signal and said function at each frequency mutually independent of said relation at each other frequency, and electrically combining said signals to obtain as solutions of said relations a set of measurements representing said properties.

4. The method of measuring a fixed plurality of properties of a product transported in a continuous industrial process comprising the steps of simultaneously subjecting said product to a fixed plurality of different radio frequency fields and detecting simultaneously at the respective frequencies of said fields the fixed plurality of separate signals the magnitudes of which are functions of all of said properties, selecting said frequencies to make the relation between said signal and said function at each frequency mutually independent of said relation at each other frequency, and electrically combining said signals to obtain a set of measurements representing said properties.

5. The method of measuring a plurality of components in a composite dielectric product in a continuous industrial process comprising the steps of simultaneously subjecting said product to radio frequency fields of different frequencies equal in number to said components, detecting simultaneously at each respective frequency a signal which is a function of the total polarization from the individual components at said respective frequency, selecting said frequencies to make the relation between said signal and said function at each frequency mutually independent of said relation at each other frequency, and electrically combining said characteristics to obtain a set of measurements representing said components.

6. Apparatus for measuring multiple components of a product transported in an industrial process comprising means for simultaneously generating a plurality of radio frequency fields in which said product passes during said process, means for simultaneously detecting a signal at each frequency which is a function of the total polarization from said components, the total number of fields being equal to the number of said components and the frequencies of said fields being selected to make the contribution of said components to said signals occur in different ratios at said different frequencies, and means for electrically combining said signals to obtain a signal representative of each of said components.

7. Apparatus according to claim 6 including means responsive to said representative signals for controlling said components of said product.

8. Apparatus for measuring multiple components of a product in an industrial process comprising a first pair of spaced capacitor plates for coupling to said product in said process, a first alternating current generator connected to said plates to impress an electromagnetic field at a first frequency on said product, means for detecting a first signal which is a function of the total polarization of said product at said first frequency, a second pair of spaced capacitor plates for coupling to said product in said process, a second alternating current generator connected to said second pair of plates to impress an electromagnetic field at a second frequency on said product, means for detecting a second signal which is a function of the total polarization of said product at said second frequency, and means for combining said first and second signals to obtain measurements representative of two of said components respectively.

9. Apparatus for measuring multiple components of a product in an industrial process comprising a pair of spaced capacitor plates for coupling to said product in said process, an alternating current generator connected to said plates to impress an electromagnetic field of the frequency of said alternating current on said product, means responsive to the voltage across said plates for detecting a signal of the effect on said current of the total polarization of said product at said frequency, a microwave generator, waveguide means for impressing a microwave field from said microwave generator on said product, microwave detector means adjacent said product in a region where said microwave field is modified by the total polarization of said product for detecting a signal in accordance with said total polarization of said product at the frequency of said microwave field and means for combining said signals at said alternating current and microwave frequencies to obtain measurements representative of two of said components respectively.

10. Apparatus for measuring multiple components of a product in an industrial process comprising a plurality of microwave waveguide circuits for applying the electromagnetic field propagated by said circuits to said product in said process, a plurality of microwave generators of different frequencies for energizing said circuits respectively, a plurality of microwave detectors for detecting signals respectively representative of the total polarization of said product at each of said frequencies, and means for combining said detected signals to obtain measurements representative respectively of a number of said components equal in number to the number of said different frequencies.

11. Apparatus for quantitatively measuring a plurality of components of a material comprising a plurality of alternating current generators equal in number to the number of said components and each generating a distinct frequency, means for impressing alternating current from each of said generators on said material, means for detecting the effect on said currents of the total polarization of said material at each of said frequencies, and means for combining the detected effects on said currents to obtain a plurality of derived signals which individually are a measure of said components, respectively, and independent of variations in the other of said components.

References Cited in the file of this patent

UNITED STATES PATENTS

| | | |
|---|---|---|
| 2,527,208 | Berry et al. | Oct. 24, 1950 |
| 2,592,101 | Aiken | Apr. 8, 1952 |
| 2,625,583 | Broding | Jan. 13, 1953 |
| 2,659,860 | Breazeale | Nov. 17, 1953 |
| 2,744,233 | Paivinen | May 1, 1956 |
| 2,920,206 | Heller | Jan. 5, 1960 |
| 2,920,272 | Erdman | Jan. 5, 1960 |
| 2,933,606 | Foster et al. | Apr. 19, 1960 |
| 3,079,551 | Walker | Feb. 26, 1963 |

FOREIGN PATENTS

| | | |
|---|---|---|
| 622,470 | Great Britain | May 3, 1949 |
| 744,311 | Great Britain | Feb. 1, 1956 |